United States Patent [19]

Schops et al.

[11] Patent Number: 5,410,945

[45] Date of Patent: May 2, 1995

[54] PRESSURE CONTROL DEVICE

[75] Inventors: Richard Schops, 3 Farmington La., Melville, N.Y. 11747; Robert Waggoner, Sulphur Spring, Tex.

[73] Assignee: Richard Schops, Melville, N.Y.

[21] Appl. No.: 108,818

[22] Filed: Aug. 17, 1993

[51] Int. Cl.⁶ .................. F01B 19/00; B60T 17/04
[52] U.S. Cl. .................... 92/48; 92/98 R; 303/87
[58] Field of Search .......... 92/48, 49, 98 R, 99, 92/101; 91/376 R; 60/547.1; 303/84.1, 87; 138/30, 31

[56] References Cited

U.S. PATENT DOCUMENTS

| 1,807,319 | 5/1931 | McCune | 303/87 |
| 2,649,169 | 8/1953 | Holman | 92/48 |
| 2,659,381 | 11/1953 | Seljos | 92/49 |
| 4,210,310 | 7/1980 | Kay | 92/49 X |
| 5,070,983 | 12/1991 | Mostevens et al. | 303/87 X |
| 5,161,864 | 11/1992 | Cardenas et al. | |
| 5,209,553 | 5/1993 | Burgdorf et al. | 303/87 X |

FOREIGN PATENT DOCUMENTS

| 209530 | 6/1960 | Austria | 92/49 |
| 0491159 | 6/1992 | European Pat. Off. | 303/87 |
| 2758724 | 4/1979 | Germany | 303/87 |
| 5039022 | 2/1993 | Japan | 303/87 |

Primary Examiner—Edward K. Look
Assistant Examiner—Hoang Nguyen
Attorney, Agent, or Firm—Amster, Rothstein & Ebenstein

[57] ABSTRACT

A pressure control accumulator for hydraulic brake systems includes a housing having a brake fluid port and a cavity communicating with the port. A staged series of resilient membranes is disposed within the cavity for nullifying hydraulic brake fluid pulsations over a wide range of pressures. The staged series preferably includes a resilient diaphragm disposed adjacent the port for nullifying hydraulic brake fluid pulsations at low and normal pressures by itself and maintaining the brake fluid on one side of the diaphragm, and a resilient membrane disposed remote from the port and normally spaced from the diaphragm, the diaphragm and the remotely-disposed membrane cooperatively nullifying hydraulic brake fluid pulsations at high pressures by providing a plurality of resilient resistances in series. The remotely disposed membrane may be a second diaphragm.

11 Claims, 2 Drawing Sheets

PRESSURE CONTROL DEVICE

BACKGROUND OF THE INVENTION

The present invention relates to a pressure control device, and more particularly to a pressure control device for hydraulic brake systems.

Conventional hydraulic automotive brake systems utilize a source of hydraulic pressure to actuate a piston to bias a brake shoe having a friction material surface into contact with a brake drum in a drum brake system or to bias a piston to move a brake pad containing friction material into contact with a vertical face of a rotor in a disk brake system. Because of the out-of-roundness inherent in brake drums and of the lateral run-out inherent in rotors, the friction element alternately engages low and high spots on the brake drum or rotor. Because of the relative incompressibility of the brake fluid the pressure in the brake system experiences a sharp increase when the friction element engages a high spot on the drum or rotor and experiences a relative pressure decrease when the friction element rubs a low spot on a drum or rotor. These pressure fluctuations which occur in the brake fluid cause pressure waves, surges, spikes and harmonics to propagate throughout the hydraulic system.

Typically, a pressure wave would move from a wheel cylinder or disk brake piston to the brake master cylinder and thereafter be reflected back from the master cylinder to the wheel cylinder or brake caliper piston. Very high momentary braking pressures occur within the hydraulic system when the reflected pressure waves, surges, spikes and harmonics moving toward the brake cylinder or piston add to clamping force already exerted thereon.

In common hydraulic automotive brake systems one or more wheels of the vehicle may lock or skid during severe braking applications while the other wheels are rotating, which may cause the vehicle operator to experience a loss of control. It may be demonstrated that wheel lockup occurs because a friction element becomes "stuck" on a so-called high spot on a disk brake drum or rotor. This wheel lockup occurs because the high spot initiates a high pressure wave into the hydraulic system which moves from a wheel cylinder or brake piston towards the master cylinder and reflects back through the brake line and adds to the clamping force already exerted on the shoe or caliper. Consequently, it has been found that the addition of a small accumulator to the hydraulic system will absorb pressure surges to maintain a constant fluid pressure at each actuator piston and thereby reduce the tendency of a friction element to premature become "stuck" on a brake drum or rotor high spot.

U.S. Pat. No. 5,161,864 discusses various types of prior art accumulators which have been added to automobile brake systems in order to reduce pressure surges as well as the disadvantages of such systems. The invention described therein provides an adjustable pressure control device for a vehicle hydraulic brake system with a housing having a brake fluid port and a cavity for receiving a diaphragm. A resilient diaphragm is mounted within the cavity, and a fluid passage in the housing connects the fluid port to the cavity to enable brake fluid to pass to one side of the diaphragm. A cap having a control chamber formed therein is affixed to the body such that it overlies the opposite side of the diaphragm. A removable variably-shaped volume control element is mounted within the control chamber in contact with the opposite side of the diaphragm. The non-resilient control element cooperates with the resilient diaphragm to control the volume of the diaphragm which enters into the control chamber and the rate at which the diaphragm collapses into the control chamber around the control element.

The '864 Patent acknowledges that the pressure control device disclosed therein can accommodate a wide range of vehicles having different fluid line pressures only by modification of particular structural elements of the device such as orifice sizes, the diaphragm, or the control element. While the device enables the pressure control device to be custom designed for a narrow range of anticipated pressures, it requires structural modification of one or more elements of the device in order to enable it to handle a different narrow range of anticipated pressures. Thus, the prior art fails to disclose a device which can handle a wide range of anticipated different pressures without any elements of the device undergoing structural modification.

Furthermore, it has now been found that the device of the '864 Patent did not operate as intended when exposed to the high pressure pulsations arising during extreme or panic braking. During very high pressure pulsations, the resilient diaphragm was found to press against the chamber wall and, thus constrained, the diaphragm could no longer oscillate sufficiently to maintain an anti-lock reaction, as necessary to produce braking efficiency. While diaphragms of higher resiliency tended to resist this phenomenon, they exhibit inferior low pressure pulsation performance because the stiff diaphragm did not permit sufficient oscillation to counter the fluid displacements.

Accordingly, it is an object of the present invention to provide a pressure control device which can handle a wide range of anticipated pressures without being structurally modified and without experiencing any performance loss such as restriction of diaphragm oscillation.

Another object is to provide such a pressure control device for a hydraulic brake system.

A further object is to provide such a pressure control device which nullifies hydraulic brake fluid pulsations over a wide range of pressures.

SUMMARY OF THE INVENTION

It has now been found that the above and related objects of the present invention are obtained in a pressure control device for hydraulic brake systems, comprising a housing having a brake fluid port and a cavity communicating with the port. A staged series of resilient elements is disposed within the cavity for nullifying hydraulic brake fluid pulsations over a wide range of pressures. Preferably, the staged series of resilient elements includes a resilient diaphragm disposed adjacent the port for nullifying hydraulic brake fluid pulsations at low and normal pressures by itself and maintaining the brake fluid on one side of the diaphragm, and a resilient element disposed remote from the port and normally spaced from the diaphragm, the diaphragm and the element cooperatively nullifying hydraulic brake fluid pulsations at high pressures by providing a plurality of resilient resistances in series.

In a preferred embodiment, the element is a second diaphragm. The diaphragm and the element cooperate when the diaphragm deforms under the influence of hydraulic brake fluid pulsations at high pressures to contact and deform the element. A spacer is disposed intermediate the diaphragm and the element adjacent to the periphery of the element. The diaphragm, the element and the spacer are maintained in the cavity by an interference fit.

Preferably where the diaphragm and the element are circular, the diaphragm has a greater diameter than the element. The element preferably has a higher resilience than the diaphragm and is substantially non-wearing on the diaphragm.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

For the purposes of the present invention, the term "resilient" refers to the resistance of an elastic element to deformation, once deformed, and the force with which it tries to return to its original configuration. The term "resilient" is employed rather than "elastic" as the latter emphasizes the ability to deform and the ability to return to an original configuration, rather than the resistance to deformation and the force of the attempt to return to the original configuration.

Figure 1:
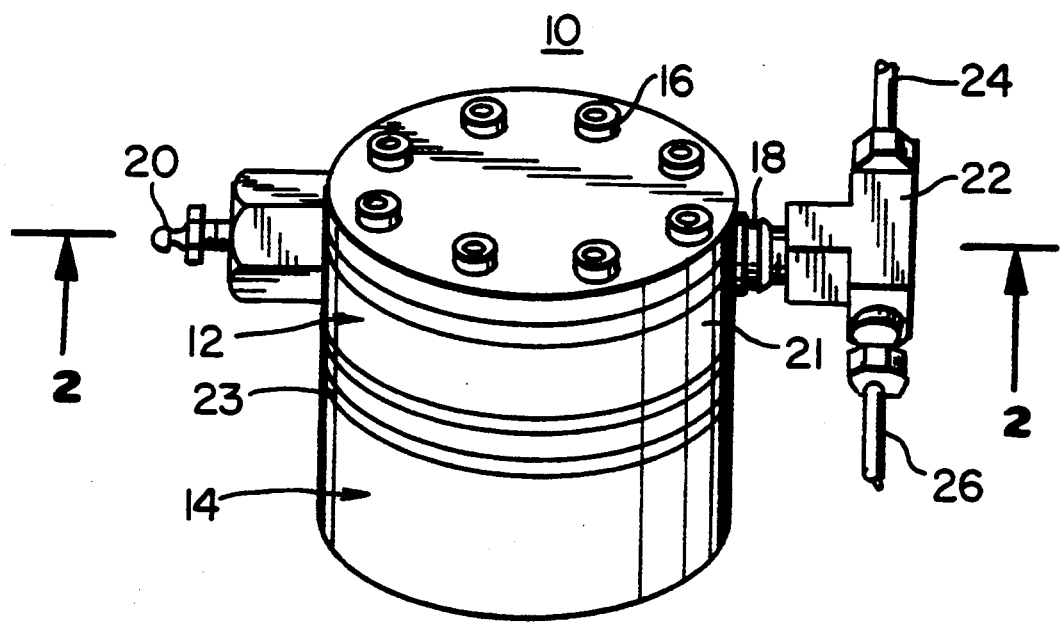
FIG. 1 is a fragmentary perspective view of the pressure control device of the subject invention mounted within a vehicle brake line.

Referring now to the drawing, and in particular to FIG. 1 thereof, the pressure control device of the present invention, generally designated by the reference numeral 10, comprises a generally cylindrical shaped housing generally designated 12, affixed to a cap element, generally designated 14, by a plurality of bolts 16. A threaded coupling 18 and a bleeder screw 20 project laterally from the outer surface 21 of housing 12. A plurality of cooling grooves 23 are formed within outer surface 21. The threaded coupling 18 connects the pressure control device 10 to a conventional T fitting 22, the opposite ends of which are connected in fluid communication with hydraulic lines 24 and 27 in a well known manner. As shown, T fitting 22 and hydraulic lines 24 and 26 illustrate the connection of the pressure control device 10 of the present invention to a hydraulic conduit leading from a vehicle brake master cylinder output line to two of the wheel cylinders in a dual chamber type master cylinder hydraulic system or to four wheel cylinders in a single chamber master cylinder hydraulic system. Of course, where a master cylinder has two separate output lines to separate pairs of brake actuator cylinders, a separate pressure control device 10 must be inserted in each of the master cylinder output lines. The device also may be inserted in the hydraulic system adjacent each wheel cylinder or caliper. In some high performance systems it may be desirable to have a pressure control device adjacent each caliper or brake cylinder.

Figure 2:
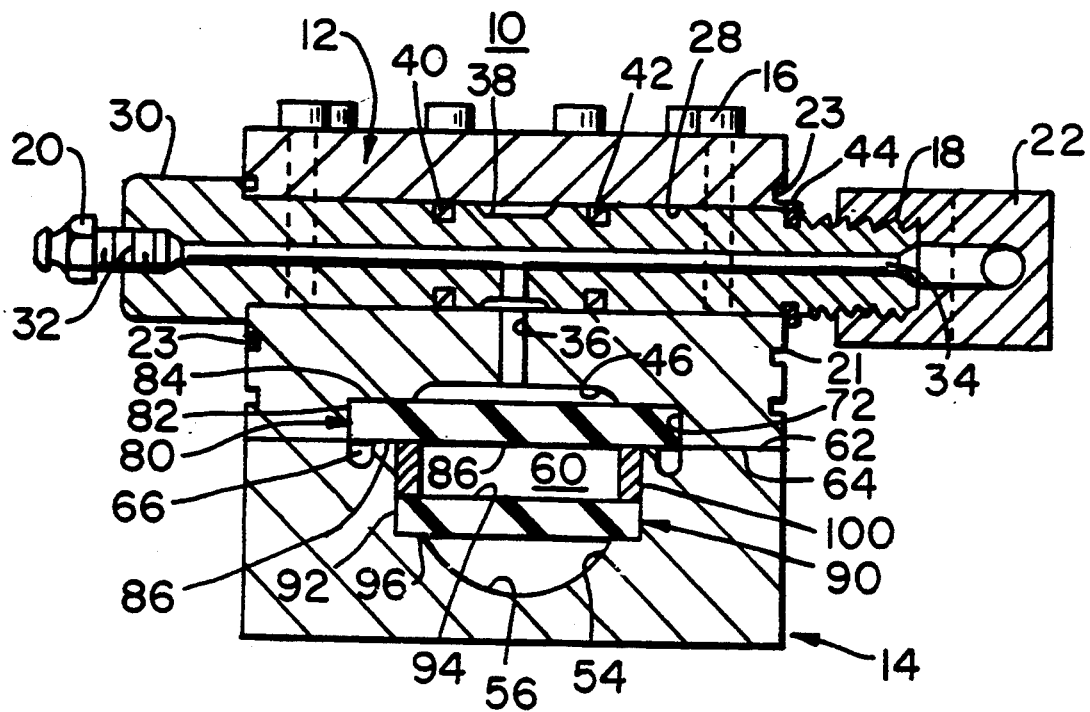
FIG. 2 is a vertical sectional view along line 2-2 of FIG. 1 without a pressure pulse applied thereto.

Details of the adjustable pressure control device 10 of the present invention may be seen by referring to FIG. 2 which provides a cross sectional view of the device. Housing 12 has a lateral bore 28 which receives a single piece adapter 30. One end of the adapter 30 has external threads 18 which engage T fitting 22 as mentioned above and the opposite end of adapter 30 has a threaded internal bore 32 which receives bleeder screw 20. A central bore 34 extends longitudinally through adapter 30. A lateral bore 36 in adapter 30 intersects central bore 34 and opens into a central reduced diameter portion 38 of the adapter 30. O rings 40 and 42 are placed on the outer surface of adapter 30 on opposite sides of the reduced diameter portion 38 to prevent hydraulic fluid from leaking out of bore 28. It may be observed that a spring clip 44 prevents adapter 30 from withdrawing from lateral bore 28. The adapter 30 may have an anti-rotation clip, not shown, which could be bent into a cooling groove 23 formed in the outer surface 21 of housing 12 to prevent rotation of the housing 12 around the outer surface of adapter 30. It should be apparent that the enlarged end of adapter 30 containing bleeder screw 20 engages The outer surface 21 of housing 12 and limits the movement of adapter 30 into bore 28.

Housing 12 further includes a stepped longitudinal bore 46 which opens into lateral bore 36.

Referring again to FIG. 2, cap 14 includes a bore 54 which cooperates with a bottom wall 56 to define an upwardly facing chamber or space 60 which opens into the stepped bore 46 of housing 12. The surface 62 of cap 14 which mates with the surface 64 of housing 12 also includes a seal groove 66. It should be noted that the maximum diameter portion 72 of bore 46 overlies cap surface 62 in the area of seal groove 66.

A resilient diaphragm, generally designated 80, has an outer diameter 82 slightly greater than the inner diameter of maximum diameter portion 72 of stepped bore 46. Diaphragm 80 fits tightly within that portion of the bore and provides a fluid-tight barrier between hydraulic brake fluid which may flow through adapter bores 34 and 36 and stepped bore 46 to one side 84 of the diaphragm 80 and chamber 60 which is sealed by the opposite side 86 of the diaphragm 80. It should be noted that a portion of diaphragm 80 is squeezed into seal groove 66. In this manner, resilient diaphragm 80 provides a fluid tight seal for chamber 60. Optionally, another O ring (not shown) may function to provide a secondary seal to prevent seepage of any hydraulic fluid which may leak past the outer diameter 82 of diaphragm 80 in bore portion 72.

Typically, diaphragm 80 would be constructed of some type of elastomeric material having a durometer rating in the range of 40 to 80 durometers. In normal braking situations the stiffness of the diaphragm 80 is such that it does not flex and attempt to move into the chamber 60. However, when a low or normal pressure peak occurs within the system, the high fluid pressure applied to the surface 84 of diaphragm 80 causes the diaphragm to tend to bow downwardly and move partially into chamber 60. The volume of diaphragm 80 which may move into space 60 and the rate at which the diaphragm 80 moves into that space is controlled by the flow bores 34, 36, 46 and diaphragm 80 within the chamber 60.

It has been found that, in addition to the shape and size of the bores 34, 35, 46 controlling the volume of diaphragm 80 and the rate of movement of diaphragm 80 into the chamber 60, these factors also may be influenced by changing the shape of the resilient diaphragm 80, the material comprising the diaphragm 80, etc. As an example, the diaphragm 80 may be constructed as a single piece of rubber or it may be constructed of rubber covering fiber or fabric layers to achieve a desired stiffness. It also may be constructed of rubber having different hardnesses such as, but not limited to, an EPDM-type (ethylene-propylene-dimethylene) rubber having durometer readings ranging from 40 through 80. Different types of diaphragms 80 and diaphragm materials may be used—e.g., a diaphragm having alternate rubber and fabric layers, or parallel, convex or concave outer surfaces 84 and/or 86—may be used for particular effects for given applications. Finally, as will become apparent hereinafter, the quantity of diaphragm 80 entering chamber 60 and the rate of movement thereof into chamber 60 is influenced by a resilient element 90 within cap 114, and more particularly within chamber 60, as set forth below.

As may appear obvious, some vehicles such as motorcycles have relatively small fluid capacity hydraulic brake systems when compared with systems in an automobile or a large vehicle such as a truck. Accordingly, in such vehicles only a small volume of the resilient diaphragm 80 must be allowed to move into the chamber 60 inasmuch as this volume must be made up by whatever fluid would be available in a reservoir for the hydraulic system.

A resilient element, generally designated 90, has an outer diameter 92 less than the outer diameter 82 of the resilient diaphragm 80, but at least slightly greater than the maximum diameter of cap bore 54. The resilient element 90 includes a surface 94 facing adjacent surface 86 of resilient diaphragm 80 and a surface 96 remote therefrom. Resilient element 90 may be a diaphragm but, as it is isolated from the brake fluid by the diaphragm 80, it need not be a diaphragm (that is, it need not be impermeable to brake fluid). Thus, while the resilient element 90 is illustrated as a diaphragm, generally similar to diaphragm 80, it may simply be a perforated or non-perforated resilient material which is preferably non-wearing on adjacent surfaces. Selection of the resilient element 90 should take into consideration the need to avoid unnecessary wear and tear on the resilient diaphragm 80 when the two are in contact (such as might be caused by using a compression spring or the like).

A rigid hollow cylindrical spacer 100 is disposed intermediate resilient diaphragm 80 and resilient element 90 and, more particularly, between surfaces 86 and 94 thereof. The resilient diaphragm 80, the resilient element 90 and the spacer 100 are maintained within the cavity 60 by an interference fit. Preferably, the spacer 100 is relatively thin and disposed adjacent the periphery of the element 90 or whichever of the element 90 and the diaphragm 80 has the smaller diameter. As illustrated, element 90 (diameter of 1.00 inch and thickness of 0.25 inch) is of lesser diameter than diaphragm 80 (diameter of 1.25 inch and thickness of 0.25 inch), although this is not necessarily the case. A preferred spacer is formed of aluminum and has an outer diameter of 1.00 inch, an annular width of 0.0625 inch and a height of from 0.275 inch (for smaller cars) to 0.400 inch (for larger cars).

Operation of the pressure control device 10 of the present invention now will be described. It may be recalled that the function of the pressure control device 10 within a hydraulic system is to eliminate pressure surges, spikes and harmonics that occur within the system during braking operations and which result from brake friction material encountering high spots on a rotor or drum which tend to apply large forces to the brake piston and induce pressure peaks within the hydraulic system as described hereinbefore. Turning again to FIG. 2, the pressure control device of the present invention connects to a vehicle hydraulic system such that hydraulic fluid within that system passes through bores 34 and 36 in adapter 30 and through stepped bore 46 to one side 84 of a resilient diaphragm 80.

Figure 3:
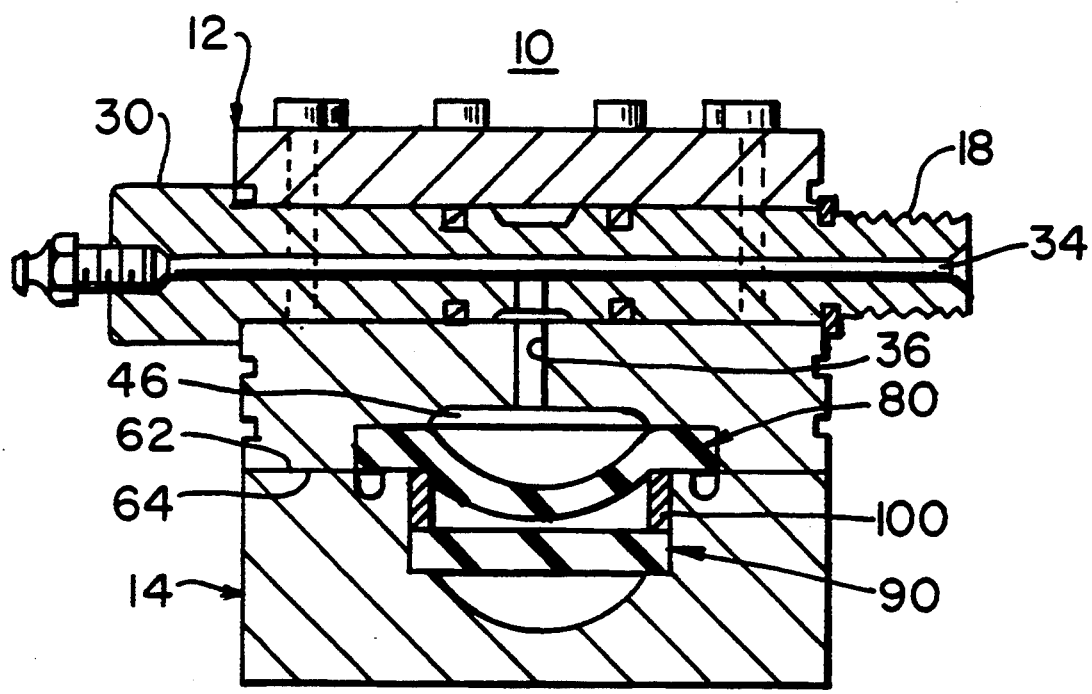
FIG. 3 is a vertical sectional view similar to FIG. 2, but with a low or normal pressure pulse applied thereto

As illustrated in FIG. 2, during normal operation of the braking system, such that there is little if any pressure pulsation within the system, the resilient diaphragm 80 and resilient element 90 remain spaced apart, with neither being deflected from their unstressed orientations. They are preferably generally linear and parallel. However, in the presence of low or normal pressure pulsations, as illustrated in FIG. 3, the resilient diaphragm 80 will bow or deflect downwardly, away from the brake fluid entering lateral bore 36 and into the cap 14. At this point, the deflecting central portion of the resilient diaphragm 80, although approaching element 90, does not contact it and is therefore free to oscillate, as necessary, in order to accommodate pressure pulsations.

Figure 4:
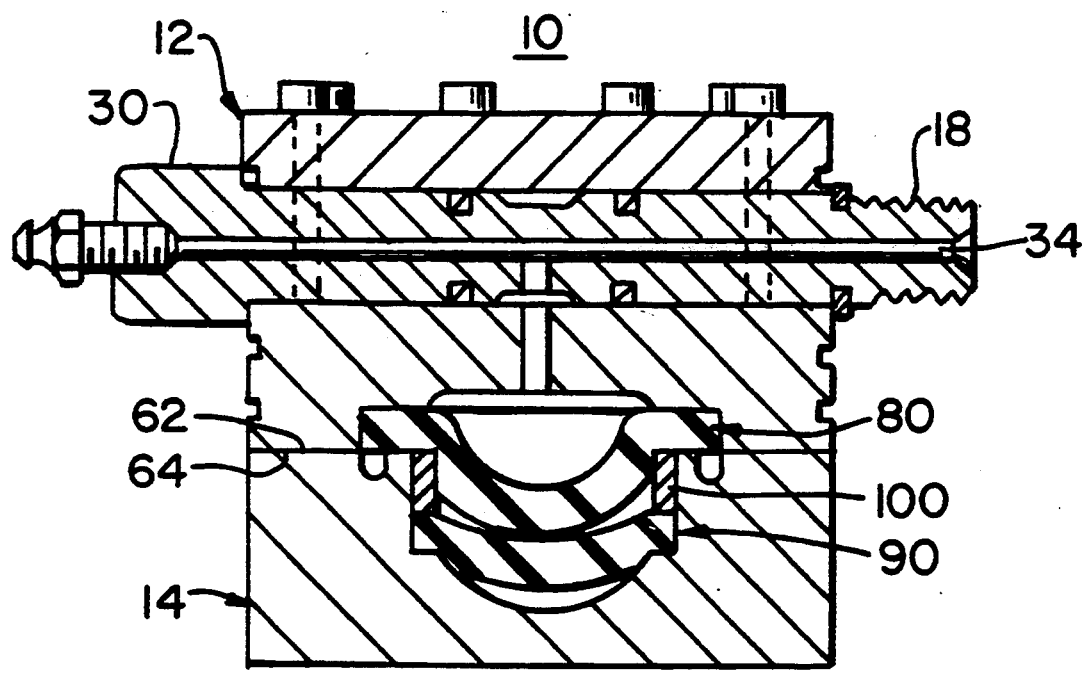
FIG. 4 is a vertical sectional view similar to FIG. 2, but with a high pressure pulse being applied thereto.

Referring now to FIG. 4, in the presence of high pressure pulsations, the central portion of resilient diaphragm 80 goes further into cap 14 and eventually the surface 86 thereof will contact adjacent surface 94 of the resilient element 90. Thereafter, any higher pressure pulsations encounter the combined resiliencies of the resilient diaphragm 80 and the resilient element 90. In other words, the elements 80, 90 provide a staged series of resilient elements for nullifying hydraulic brake fluid pulsations over a wide range of pressures, low and normal pressure pulsations being resisted by the resilient diaphragm 80 alone and higher pressure pulsations being resisted by a combination of the resilient diaphragm 80 and the resilient element 90.

Thus, during normal braking, the resilient diaphragm 80 has ample capacity to provide mechanical anti-lock pressure modulation until the braking forces reach a maximum, at which time the resilient diaphragm 80 is pressed against the resilient element 90 (that is, the high pressure diaphragm 90) thereby allowing continued operation of the device with an increased level of resilience being exerted by the combined diaphragm and element 80, 90.

It will be appreciated that the resilient element 90 need not have a higher resiliency than the resilient diaphragm 80 since at least a portion of its resiliency will be added to the resiliency of the resilient diaphragm in order to resist the higher pressure pulsations. Nonetheless, it is generally preferred that the resilient element 90 be at least as resilient as the resilient diaphragm 80, and preferably more so. Thus, typically, the resilient element 90 has a higher hardness, rigidity or stiffness than the diaphragm 80. Even if one assumes for both elements 80, 90 a linearity of the resilient stress produced in response to the strain applied, the cumulative resistances may not be strictly additive on a one-for-one basis. However it is well within the skill of those skilled in the art to determine by routine experimentation the most suitable resiliencies for each element 80, 90 for a particular vehicular application.

Most importantly, because the resilient element 90 is able to flex with the resilient diaphragm 80, it only minimally impedes the free oscillation thereof in response to the pressure pulsations and, thus, does not "inactivate" the resilient diaphragm 80 as would a rigid wall in contact therewith.

Because the area of contact between the two elements 80, 90 will vary over time and because each element is resilient, the two elements 80, 90 are substantially non-wearing on each other and have an acceptable longevity. The resilient diaphragm 80 typically has a greater diameter than the resilient element 90. As the resiliency of a material increases as the ratio between the diameter and thickness thereof decreases, the lower diameter resilient element 90 typically has a higher resiliency than the larger diameter resilient diaphragm 80.

To summarize, the present invention provides a pressure control device which may be used with a hydraulic brake system to nullify hydraulic brake fluid pulsations over a wide range of anticipated pressures, without requiring any type of structural modifications and without experiencing any performance loss.

The device of the present invention exhibits an ability to operate over two distinct and separate pressure ranges by virtue of a staged series of resilient elements. Operability over a comparably wide pressure range is not possible for the limited performance of single diaphragm designs, such as that disclosed in U.S. Pat. No. 5,161,864. The addition of the second element allows a less resilient first diaphragm to operate with greater efficiency to control pulsations in the low and normal pressure ranges—that is, during normal braking—and a second diaphragm (optionally more resilient than the first) to operate in conjunction with the first to control pulsations in high pressure ranges—that is, during extreme or panic braking. Thus the device of the present invention significantly increases the performance envelope for both operations, both the normal pressure pulsations arising out of normal braking operation and the high pressure pulsations arising out of panic/extreme pressure braking operation.

It will be appreciated that the expansion of the performance envelope of a pressure control device according to the present invention is not intended to eliminate the need to calibrate individual devices for the diversity found in modern brake system designs. The normal and extreme target pressure/volume are still to be tailored with changes of shape or size in the device structure, including the resilient diaphragm, the resilient element, the spacer and the cavity. However the pressure control device of the present invention enables a wide performance envelope for any such selected device structure.

Now that the preferred embodiments of the present invention have been shown and described in detail, various modifications and improvements thereon will become readily apparent to those skill in the art. Accordingly, the spirit and scope of the present invention is to be interpreted broadly and limited only by the appended claims, and not by the foregoing specification.

We claim:

1. A pressure control device for hydraulic brake systems, comprising:
    (A) a housing having a brake fluid port and a cavity communicating with said port; and
    (B) a staged series of resilient elements disposed within said cavity for nullifying hydraulic brake fluid pulsations over a wide range of pressures.

2. The device of claim 1 wherein said staged series of resilient elements includes:
    (i) a resilient diaphragm disposed adjacent said port for nullifying hydraulic brake fluid pulsations at low and normal pressures by itself and maintaining the brake fluid on one side of said diaphragm, and
    (ii) a resilient element disposed remote from said port and normally spaced from said diaphragm, said diaphragm and said element cooperatively nullifying hydraulic brake fluid pulsations at high pressures by providing a plurality of resilient resistances in series.

3. A pressure control device for hydraulic brake systems, comprising:
    (A) a housing having a brake fluid port and a cavity communicating with said port; and
    (B) a staged series of resilient elements disposed within said cavity for nullifying hydraulic brake fluid pulsations over a wide range of pressures, said staged series of resilient elements including:
    (i) a resilient diaphragm disposed adjacent said port for nullifying hydraulic brake fluid pulsations at low and normal pressures by itself and maintaining the brake fluid on one side of said diaphragm, and
    (ii) a resilient element disposed remote from said port and normally spaced from said diaphragm, said diaphragm and said element cooperatively nullifying hydraulic brake fluid pulsations at high pressures by providing a plurality of resilient resistances in series, said element being a second diaphragm.

4. The device of claim 2 wherein said diaphragm and said element cooperate when said diaphragm deforms under the influence of hydraulic brake fluid pulsations at high pressures to contact and deform said element.

5. The device of claim 2 additionally including a spacer disposed intermediate said diaphragm and said element adjacent to the periphery of said element.

6. The device of claim 5 wherein said diaphragm, said element and said spacer are maintained in said cavity by an interference fit.

7. The device of claim 2 wherein said diaphragm has a greater diameter than said element.

8. The device of claim 2 wherein said element has a higher resiliency than said diaphragm.

9. The device of claim 2 wherein said element is substantially non-wearing on said diaphragm.

10. A pressure control device for hydraulic brake systems, comprising:
    (A) a housing having a brake fluid port and a cavity communicating with said port; and
    (B) a staged series of resilient elements disposed within said cavity for nullifying hydraulic brake fluid pulsations over a wide range of pressures, said staged series of resilient elements including:
    (i) a first resilient diaphragm disposed adjacent said port for nullifying hydraulic brake fluid pulsations at low and normal pressures by itself and maintaining the brake fluid on one side of said first diaphragm; and
    (ii) a second resilient diaphragm disposed remote from said port and normally spaced from said first diaphragm, said first diaphragm and said second diaphragm cooperatively nullifying hydraulic brake fluid pulsations at high pressures by providing a plurality of resilient resistances in series, said diaphragms cooperating when said first diaphragm deforms under the influence of hydraulic brake fluid pulsations at high pressures to contact and deform said second diaphragm, said second diaphragm having a higher resiliency than said first diaphragm and being substantially non-wearing on said first diaphragm.

11. The device of claim 10 additionally including a spacer disposed intermediate said diaphragms adjacent to the periphery of said second diaphragm, said diaphragms and said spacer being maintained in said cavity by an interference fit.

* * * * *